(12) United States Patent
Fukuda (10) Patent No.: US 7,892,122 B2
(45) Date of Patent: Feb. 22, 2011

(54) ELECTRICALLY OPERATED DERAILLEUR WITH A POWER STORING MECHANISM

(75) Inventor: Masahiko Fukuda, Amagasaki (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 455 days.

(21) Appl. No.: 12/035,709

(22) Filed: Feb. 22, 2008

(65) Prior Publication Data
US 2009/0215561 A1    Aug. 27, 2009

(51) Int. Cl.
*F16H 63/04*    (2006.01)
(52) U.S. Cl. .......................................... 474/82; 474/80
(58) Field of Classification Search ............. 474/69–70, 474/78, 80–82
See application file for complete search history.

(56) References Cited

U.S. PATENT DOCUMENTS

| | | | |
|---|---|---|---|
| 2,839,939 | A | 6/1958 | Juy |
| 3,919,891 | A | 11/1975 | Stuhlmuller et al. |
| 3,974,707 | A | 8/1976 | Nagano |
| 4,132,119 | A | 1/1979 | Nagano et al. |
| 4,185,510 | A | 1/1980 | Juy |
| 4,437,848 | A | 3/1984 | Shimano |
| 4,507,101 | A | 3/1985 | Nagano |
| 4,734,084 | A | 3/1988 | Nagano |
| 4,861,320 | A | 8/1989 | Nagano |
| 4,946,425 | A | 8/1990 | Buhlmann |
| 5,359,884 | A | 11/1994 | Fey et al. |
| 5,470,277 | A | 11/1995 | Romano |
| 5,480,356 | A | 1/1996 | Campagnolo |
| 5,494,307 | A | 2/1996 | Anderson |
| 5,518,456 | A | 5/1996 | Kojima et al. |
| 5,860,880 | A | 1/1999 | Oka |
| 6,162,140 | A | 12/2000 | Fukuda |
| 6,623,389 | B1 | 9/2003 | Campagnolo |
| 6,997,835 | B2 * | 2/2006 | Fukuda ...................... 474/82 |
| 7,290,458 | B2 * | 11/2007 | Fukuda ........................ 74/82 |

(Continued)

FOREIGN PATENT DOCUMENTS

EP          543452 A       5/1993

(Continued)

OTHER PUBLICATIONS

European Search Report for EP 08103230.2, the European application that corresponds to this application, dated Jul. 9, 2009.

*Primary Examiner*—Sang Kim
(74) *Attorney, Agent, or Firm*—James A. Deland (57) ABSTRACT

A derailleur for a bicycle comprises a base member, a movable member for supporting a chain guide, a linkage mechanism coupling the base member to the movable member, an electrically operated actuating element, and a power storing mechanism. Moving the actuating element causes the movable member to move laterally. A first portion of the power storing mechanism is disposed in a first power transmission path between the actuating element and the movable member, and a second portion of the power storing mechanism is disposed in a different second power transmission path between the actuating element and the movable member. The actuating element comprises a first actuating member and a second actuating member. The first actuating member communicates force in the first power transmission path, the second actuating member communicates force in the second power transmission path, and the first actuating member moves relative to the second actuating member.

21 Claims, 9 Drawing Sheets

| U.S. PATENT DOCUMENTS | | | |
|---|---|---|---|
| 7,467,567 B2 * | 12/2008 | Fukuda | 74/412 R |

FOREIGN PATENT DOCUMENTS

| EP | 845408 | A2 | 6/1998 |
|---|---|---|---|
| EP | 1424275 | A2 | 6/2004 |
| EP | 1609716 | A2 | 12/2005 |
| FR | 2587079 | A1 | 9/1985 |

* cited by examiner

ELECTRICALLY OPERATED DERAILLEUR WITH A POWER STORING MECHANISM

BACKGROUND OF THE INVENTION

The present invention is directed to bicycles and, more particularly, to various features of an electrically operated bicycle derailleur.

Derailleur operated bicycle transmissions typically comprise a plurality of sprockets that rotate with another rotating member (e.g., the front crank and/or the rear wheel of the bicycle) and a derailleur that is used to shift a chain among the plurality of sprockets. Conventional derailleurs comprise a base member adapted to be mounted to the bicycle frame, a movable member supporting a chain guide, and a linkage mechanism coupled between the base member and the movable member so that the movable member can move laterally inwardly and outwardly relative to the bicycle. Such derailleurs are manually controlled by a hand operated actuator such as a lever or twist-grip attached to the bicycle handlebar, wherein the derailleur is connected to the actuator by a bowden cable.

Recently, various electronic devices have been used to control the movement of the derailleur. Such devices sometimes comprise a traveling condition detector for detecting a traveling condition of the bicycle, a motor for moving the derailleur laterally inwardly and outwardly relative to the plurality of sprockets, and a processor. The processor controls the motor in response to the detected traveling condition so that the derailleur is in the proper position to maintain the traveling condition within a desired range.

The motor used to move the derailleur typically moves the derailleur laterally inwardly and/or laterally outwardly by moving an actuating member such as an actuating arm or a pivot shaft attached to the linkage mechanism. Unfortunately, sometimes the movable member experiences significant resistance to lateral movement, especially when the plurality of sprockets are stationary, and this resistance is communicated to the actuating member. Since the motor may be unable to move the actuating member in such a situation, there is a risk of damage to the motor. Another problem is that an external force may be applied to the movable member such as a force directed toward the wheel when the bicycle lays or falls down, or a force directed away from the wheel if the derailleur catches some external object. Such external forces also may be communicated to the actuating member, thus again risking damage to the motor.

SUMMARY OF THE INVENTION

The present invention is directed to various features of an electrically operated bicycle derailleur. In one embodiment, a derailleur for a bicycle comprises a base member for attaching the derailleur to the bicycle, a movable member for supporting a chain guide, a linkage mechanism coupling the base member to the movable member so that the movable member is capable of movement relative to the base member, an electrically operated actuating element operatively coupled to the linkage mechanism, and a power storing mechanism. Moving the actuating element in a first direction causes the movable member to move laterally toward the bicycle, and moving the actuating element in a second direction causes the movable member to move laterally away from the bicycle. A first portion of the power storing mechanism is disposed in a first power transmission path between the actuating element and the movable member for storing relative forces applied between the actuating element and the movable member along the first power transmission path, and a second portion of the power storing mechanism is disposed in a different second power transmission path between the actuating element and the movable member for storing relative forces applied between the actuating element and the movable member along the second power transmission path. The actuating element comprises a first actuating member and a second actuating member, wherein the first actuating member communicates force in the first power transmission path, the second actuating member communicates force in the second power transmission path, and the first actuating member moves relative to the second actuating member.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
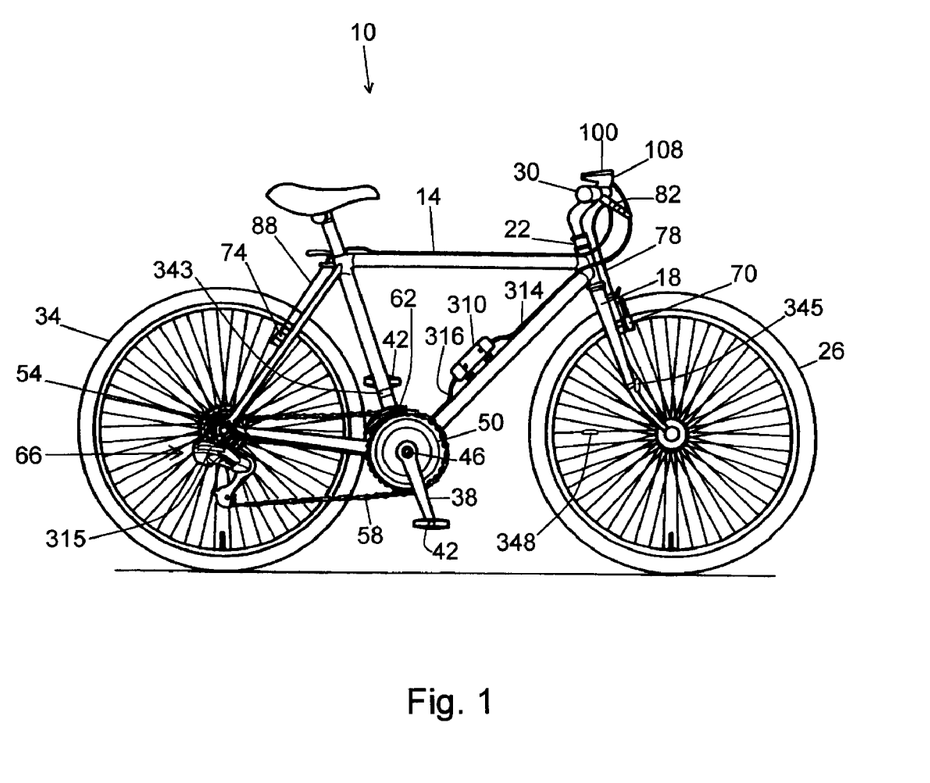
FIG. 1 is a side view of a bicycle that includes a particular embodiment of an electronically controlled bicycle transmission.
Figure 2:
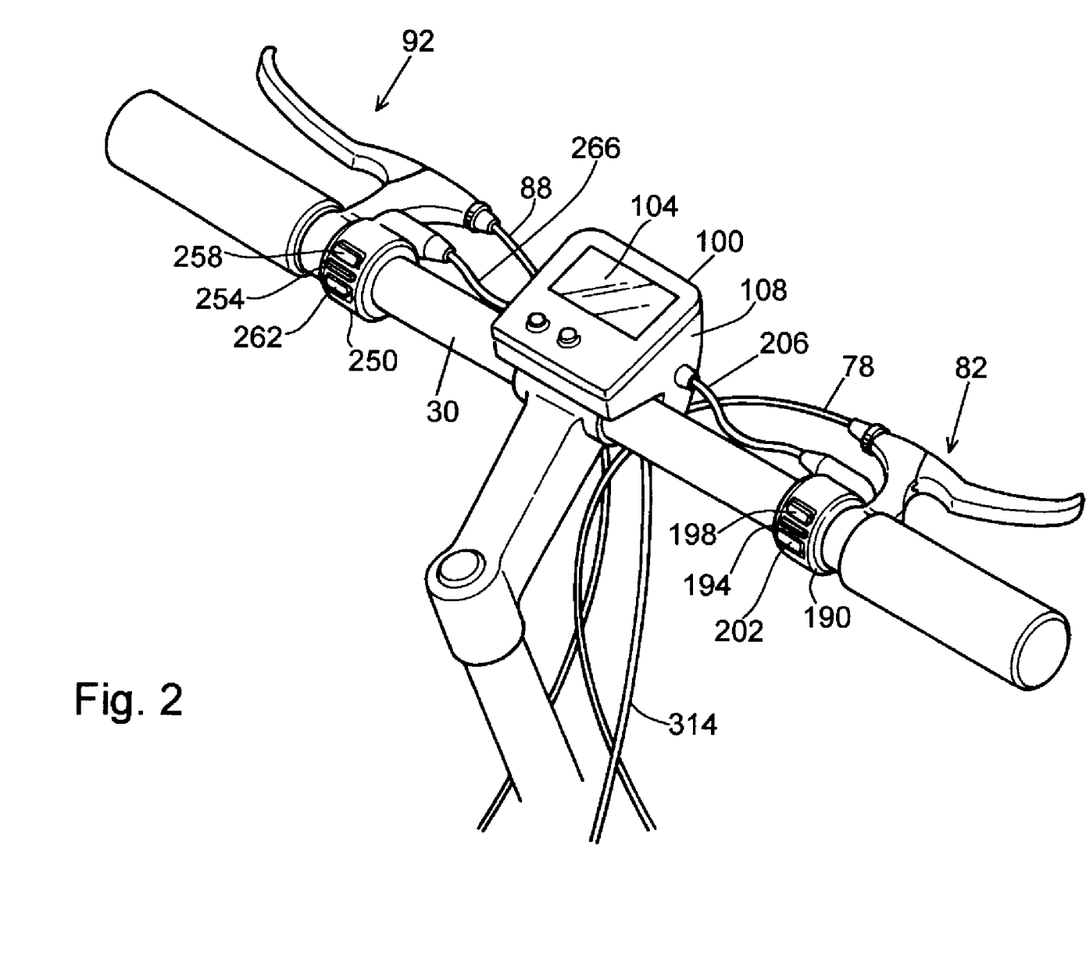
FIG. 2 is an oblique view of the handlebar mounted components of the electronically controlled bicycled transmission.

FIG. 1 is a side view of a bicycle 10 that includes a particular embodiment of an electronically controlled bicycle transmission. Bicycle 10 has a frame 14, a front fork 18 rotatably supported in a head tube 22 of frame 14, a front wheel 26 rotatably supported by fork 18, a handlebar 30 for rotating fork 18 (and hence front wheel 26) in the desired direction, and a rear wheel 34 rotatably supported at the rear of frame 14. A pair of crank arms 38, each supporting a pedal 42, are mounted to an axle 46 that is rotatably supported in a lower portion of frame 14. A plurality of front sprockets 50 are mounted to the right side crank arm 38 for rotating with the right side crank arm 38, and a sprocket unit 54 comprising a plurality of rear sprockets 54a-54g (FIG. 3) are mounted to the rear wheel 34 for rotating with rear wheel 34. A chain 58 engages one of the plurality of front sprockets 50 and one of the plurality of rear sprockets 54a-54g. A front derailleur 62 is mounted to frame 14 in close proximity to the plurality of front sprockets 50 for moving chain 58 among the plurality of front sprockets 50, and a rear derailleur 66 is mounted to frame 14 in close proximity to the sprocket unit 54 for moving chain 58 among the plurality of rear sprockets 54a-54g. A front braking unit 70 is mounted to fork 18 for braking front wheel 26, and a rear braking unit 74 is mounted to the rear of frame 14 for braking rear wheel 34. Front braking unit 70 is connected to a Bowden-type control cable 78 that is connected to a brake lever assembly 82 mounted on the right side of handlebar 30 as shown in FIG. 2. Similarly, rear braking unit 74 is connected to a Bowden-type control cable 88 that is connected to a brake lever assembly 92 mounted on the left side of handlebar 30.

As shown in FIGS. 1-2, a display housing 100 having an LCD display 104 is coupled to a mounting bracket 108 attached to handlebar 30. A right switch housing 190 containing a mode switch 194, a rear derailleur upshift switch 198, and a rear derailleur downshift switch 202 is mounted to the right side of handlebar 30. Similarly, a left switch housing 250 containing a mode switch 254, a front derailleur upshift switch 258, and a front derailleur downshift switch 262 is mounted to the left side of handlebar 30. The components disposed in right switch housing 190 are coupled to the components in display housing 100 through a communication path 206, and the components disposed in left switch housing 250 are coupled to the components in display housing 100 through a communication path 266. Mode switches 194 and 254 may be used to switch between a manual shifting mode and one or more automatic shifting modes, to change the information displayed on display 104, and so on. A main derailleur control unit 310 is mounted to frame 14, and it is electrically coupled to mounting bracket 108 through an intermediate communication path 314. A rear derailleur control housing 315 is mounted to rear derailleur 66, and it is electrically coupled to main derailleur control unit 310 through an intermediate communication path 316. A crank rotation sensor 343 is provided for sensing signals from a magnet (not shown) coupled to the left side crank arm 38 to determine the rate of rotation of crank arms 38 in a known manner, and a wheel rotation sensor 345 is provided for sensing signals from a magnet 348 mounted to front wheel 26 to determine the speed of the bicycle in a known manner. Crank rotation sensor 343 and wheel rotation sensor 345 are coupled to main derailleur control unit 310 through separate communication paths (not shown).

Figure 3:
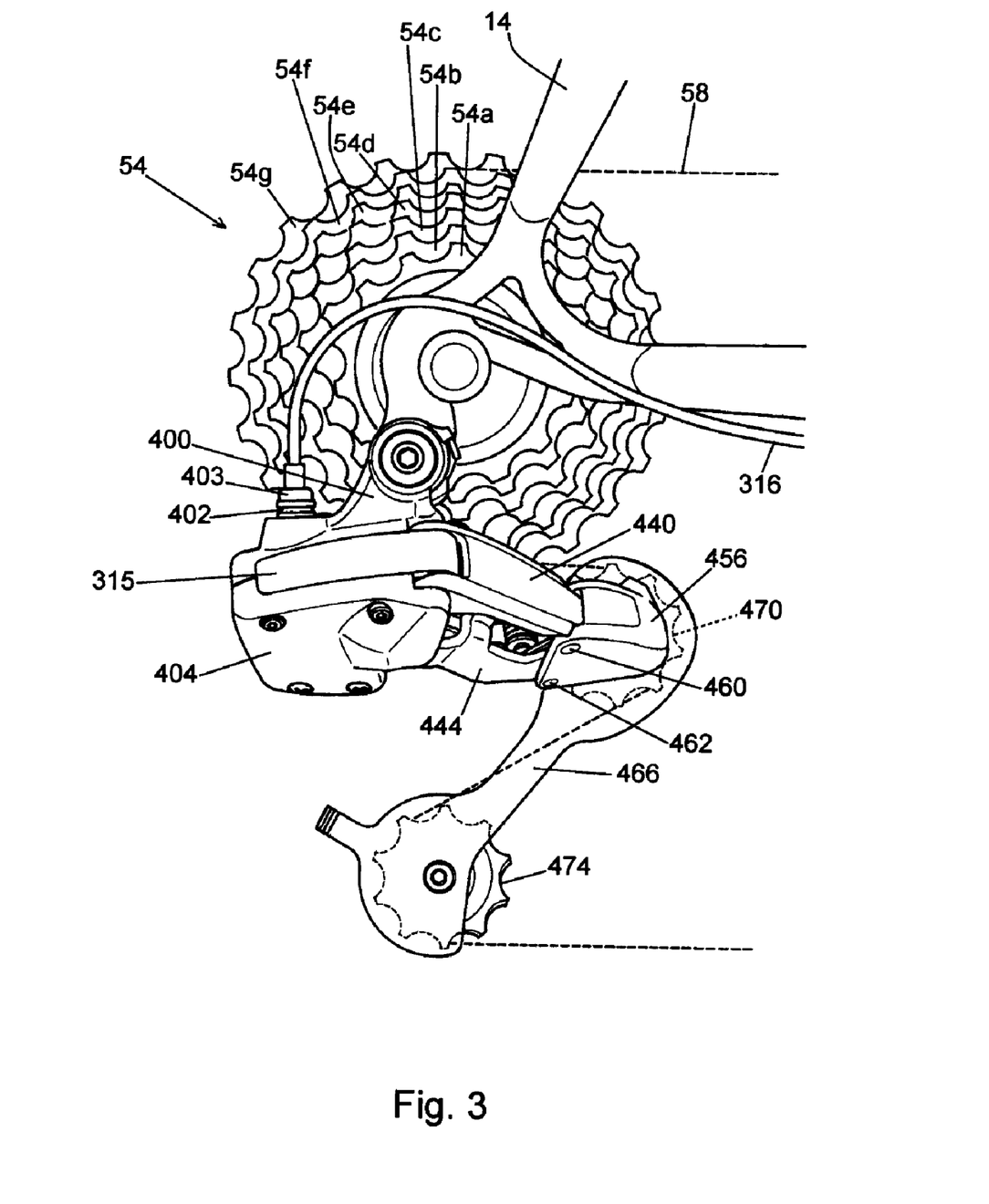
FIG. 3 is a closer view of the rear derailleur and sprocket assembly shown in FIG. 1.
Figure 4:
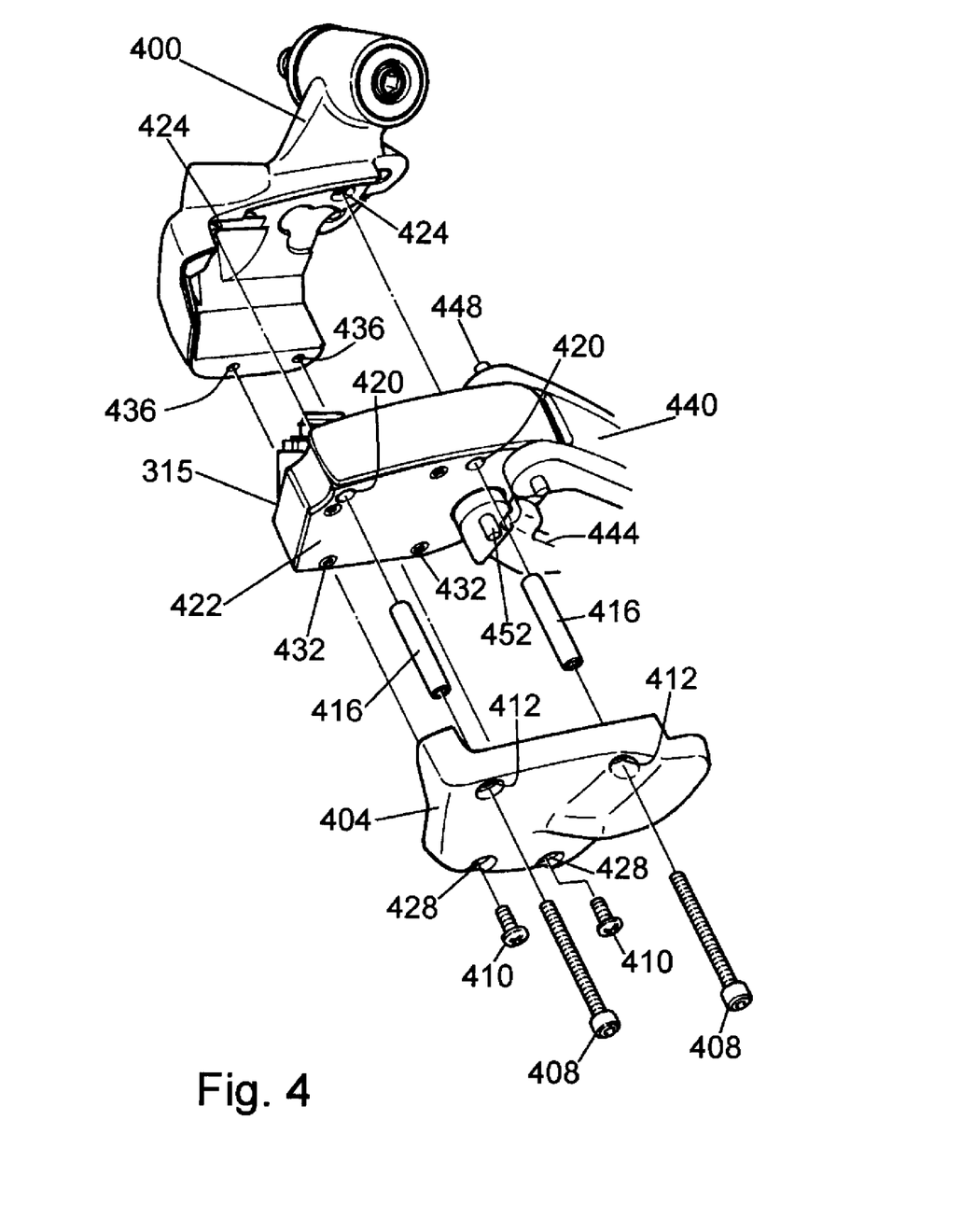
FIG. 4 is a partially exploded view of the derailleur shown in FIG. 3.

As shown in FIGS. 3 and 4, rear derailleur control housing 315 is mounted between a base member 400 and an outer cover 404 of rear derailleur 66. Base member 400 is swingably mounted to frame 14 in a known manner, and it includes an electrical connector 402 for connecting to a complementary connector 403 on intermediate communication path 316. As shown in FIG. 4, outer cover 404 and rear derailleur control housing 315 are mounted to base member 400 by screws 408 and 410. Screws 408 extend through openings 412 in outer cover 404, through spacer tubes 416 that extend through openings 420 in a rear derailleur control housing cover 422 and into threaded openings 424 in base member 400. Screws 410 extend through openings 428 in outer cover 404, through openings 432 in rear derailleur control housing cover 422, and into threaded openings 436 in base member 400.

Rear derailleur 66 further comprises a linkage mechanism in the form of link members 440 and 444 pivotably coupled to rear derailleur control housing 315 through a pivot shaft 448 and a pivot shaft unit 452. The other ends of link members 440 and 444 are pivotably coupled to a movable member 456 through respective pivot shafts 460 and 462. Movable member 456 rotatably supports a chain guide 466 which, in turn, rotatably supports a guide pulley 470 and a tension pulley 474 for engaging chain 58 in a known manner. As discussed in more detail below, a motor 480 (FIG. 5) rotates pivot shaft unit 452 for causing link member 444 to move movable member 456 and chain guide 466 laterally for transferring chain 58 among the plurality of rear sprockets 54a-54g.

Figure 5:
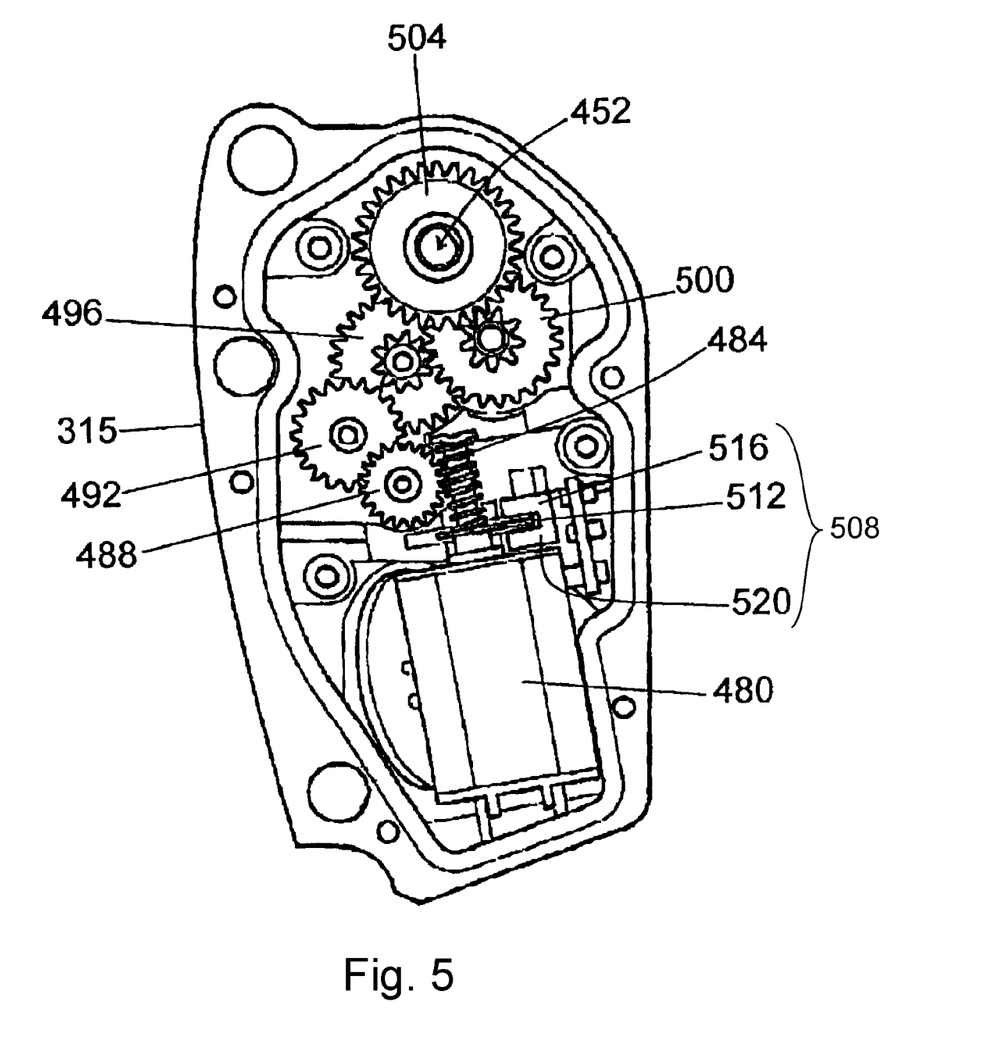
FIG. 5 is a view of the rear derailleur control housing illustrating a particular embodiment of a motor drive mechanism.

FIG. 5 is a view illustrating the contents of rear derailleur control housing 315 with rear derailleur control housing cover 422 removed. As shown in FIG. 5, motor 480 includes a pinion drive shaft 484 that drives pivot shaft unit 452 through a gear reduction mechanism comprising gears 488, 492, 496, 500 and 504, wherein a small diameter gear portion of each gear 488, 492, 496 and 500 drives a larger diameter gear portion of the next gear in the power transmission path. Driven gear 504 rotates integrally with pivot shaft unit 452. A digital signal providing mechanism in the form of a digital position sensor 508 is mounted in rear derailleur control housing 315. Digital position sensor 508 includes a shutter wheel 512 that rotates integrally with pinion drive shaft 484, a light source such as an LED 516 disposed on one side of shutter wheel 512, and a light detector such as a phototransistor 520 disposed on the other side of shutter wheel 512. Rotation of shutter wheel 512 with pinion drive shaft 484 causes the passage of light from LED 516 to phototransistor 520 to be intermittently blocked, thus producing a digital signal having a period determined by the rate of rotation of shutter wheel 512.

Figure 6:
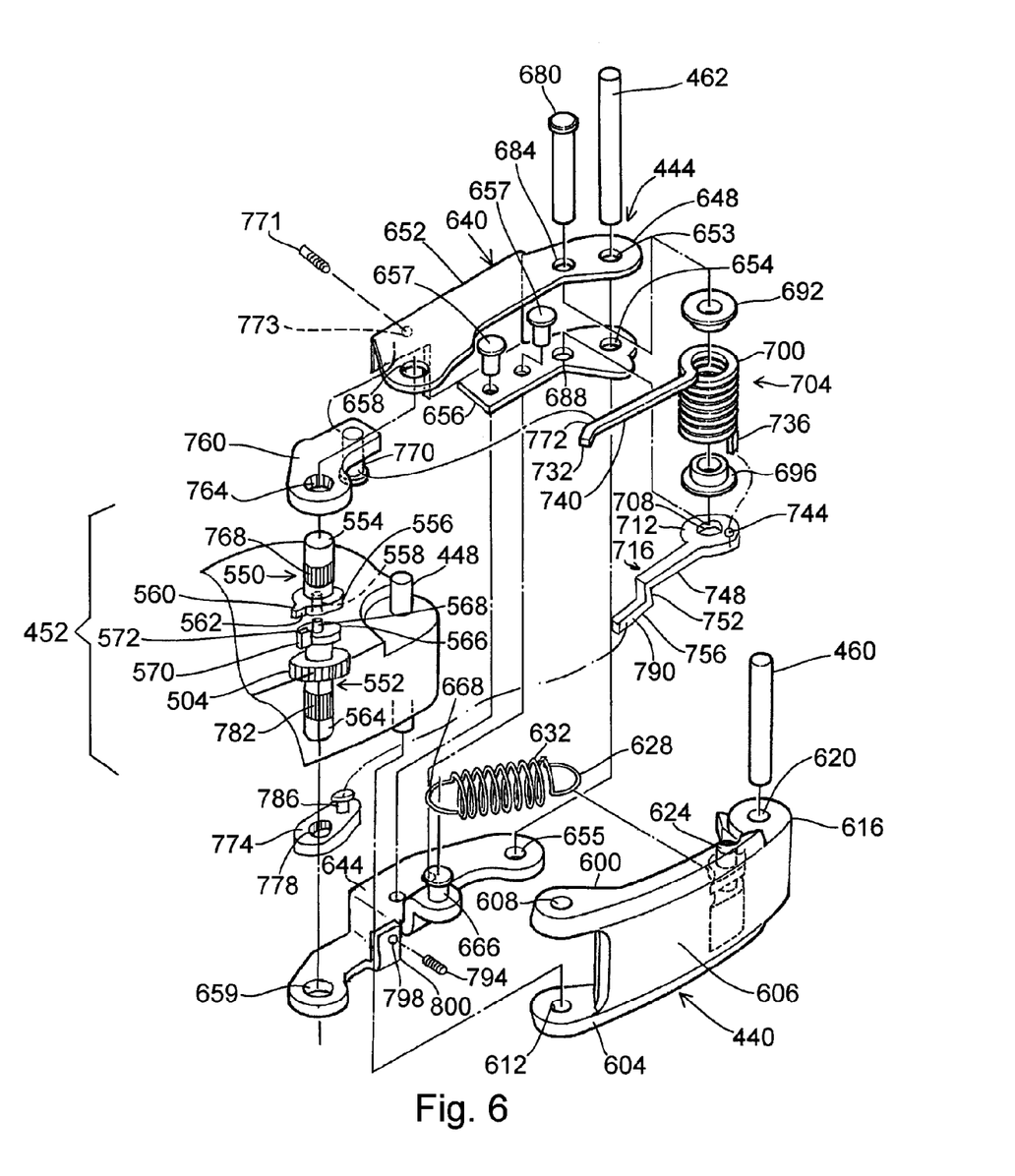
FIG. 6 is an exploded view of the linkage mechanism and the power storing mechanism of the derailleur shown in FIG. 3.

FIG. 6 is an exploded view of the linkage mechanism and a power storage mechanism for rear derailleur 66. In this embodiment, pivot shaft unit 452 comprises a first pivot shaft portion 550 and a second pivot shaft portion 552. First pivot shaft portion 550 includes a first pivot shaft 554, a generally circular first coupling flange 556, and an alignment bore 558 disposed at the bottom of first pivot shaft 554. First coupling flange 556 includes a radially outwardly extending first coupling projection 560 with a first coupling surface 562. Second pivot shaft portion 552 includes a second pivot shaft 564, a generally circular second coupling flange 566, and an alignment projection 568 disposed at the top of second pivot shaft 564. Alignment projection 568 fits within alignment bore 558 so that first pivot shaft portion 550 is capable of rotating relative to second pivot shaft portion 552. Second coupling flange 566 includes a radially outwardly extending second coupling projection 570 that also extends upwardly. Second coupling projection 570 has a second coupling surface 572 for engaging (e.g., contacting) first coupling surface 562 on first coupling projection 560 of first coupling flange 556. Gear 504 is nonrotatably mounted to second pivot shaft 564.

Link member 440 includes spaced apart mounting ears 600 and 604 and a mounting cylinder, wherein mounting ears 600 and 604 extend from one end of a side wall 606, and mounting cylinder 616 extend from an opposite end of side wall 606. Mounting ears 600 and 604 have respective openings 608 and 612 for receiving pivot shaft 448 therethrough, and mounting cylinder 616 has an opening 620 for receiving pivot shaft 460 therethrough. A spring hooking member 624 is disposed on the inner side of side wall 606 in close proximity to mounting cylinder 616 for retaining a first end 628 of a coil spring 632.

Link member 444 includes a first link plate 640 and a second link plate 644. First link plate 640 has a generally U-shape formed by an upper wall 648, a side wall 652 and a bottom wall 656, wherein bottom wall 656 is fastened to second link plate 644 through rivets 657. A generally circular opening 658 is formed on one end of upper wall 648 of first link plate 640, and a generally circular opening 659 is formed on one end of second link plate 644, wherein circular opening 658 receives first pivot shaft 554 therethrough, and circular opening 659 receives second pivot shaft 564 therethrough so that first link plate 640 and second link plate 644 can rotate around pivot shaft unit 452. Similarly, respective openings 653 and 654 are formed on the opposite ends of upper wall 648 and lower wall 656 of first link plate 640, and another opening 655 is formed on the opposite end of second link plate 644, wherein openings 653, 654 and 655 receive pivot shaft 462 therethrough.

A spring hooking member 666 is disposed at an intermediate portion of second link plate 644 for retaining a second end 668 of spring 632. Spring 632 functions to take up the play in the gear reduction mechanism in rear derailleur control housing 315. A spring shaft 680 extends through openings 684 and 688 in upper wall 648 and bottom wall 656, respectively, of first link plate 640, through upper and lower bushings 692 and 696, through a coiled section 700 of a coil spring 704 disposed between bushings 692 and 696, and through an opening 708 in a base portion 712 of a spring coupling member 716. Coil spring 704 is an example of a power storing mechanism that has a first end 732 and a second end 736, wherein first end 732 is disposed at the end of a biasing element in the form of a leg 740 of coil spring 704, and wherein second end 736 is disposed in a coupling opening 744 in base portion 712 of another biasing element in the form of spring coupling member 716. Spring coupling member 716 includes a first leg 748 that extends radially outwardly from base portion 712, a step portion 752 that extends axially downwardly from first leg 748, and a second leg 756 that extends radially outwardly from step portion 752. In this embodiment, the spring constant of spring 704 is greater than the spring constant of spring 632 because spring 704 is used to store power when movable member 456 moves in the upshifting and downshifting directions, whereas spring 632 merely takes up the play in the gear reduction mechanism in rear derailleur control housing 315.

A first actuating member in the form of a first actuating arm 760 has a splined opening 764 formed on a proximal end thereof for nonrotatably engaging a splined outer peripheral surface 768 on first pivot shaft 554 so that first actuating arm 760 and first pivot shaft 554 rotate as a unit. A first spring abutment 770 in the form of a post projects downwardly from a distal end of first actuating arm 760 for abutting against a side surface 772 of first end 732 of coil spring 704. An adjustment screw 771 engages a threaded opening 773 in side wall 562 of first link plate 640, wherein adjustment screw 771 contacts first actuating arm 760 to adjust the range of motion of first actuating arm 760 relative to first link plate 640. A second actuating member in the form of a second actuating arm 774 has a splined opening 778 formed on a proximal end thereof for nonrotatably engaging a splined outer peripheral surface 782 on second pivot shaft 564 so that second actuating arm 774 and second pivot shaft 564 rotate as a unit. A second spring abutment 786 in the form of a post projects upwardly from a distal end of second actuating arm 774 for abutting against a side surface 790 of second leg 756 of spring coupling member 716. An adjustment screw 794 engages a threaded opening 798 in a screw supporting tab 800 of second link plate 644, wherein adjustment screw 794 contacts step portion 752 of spring coupling member 716 to adjust the play between second actuating arm 774 and spring coupling member 716.

Figure 7A:
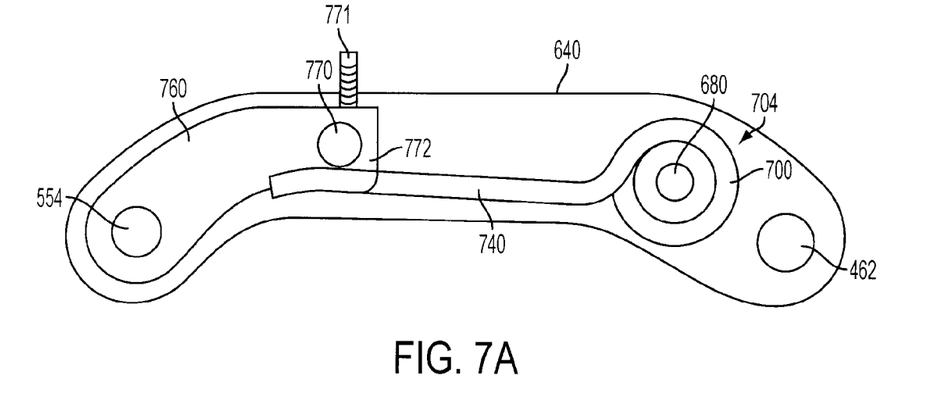
FIG. 7A is a schematic view of a first portion of the linkage mechanism and a first portion of the power storing mechanism in a neutral state.
Figure 7B:
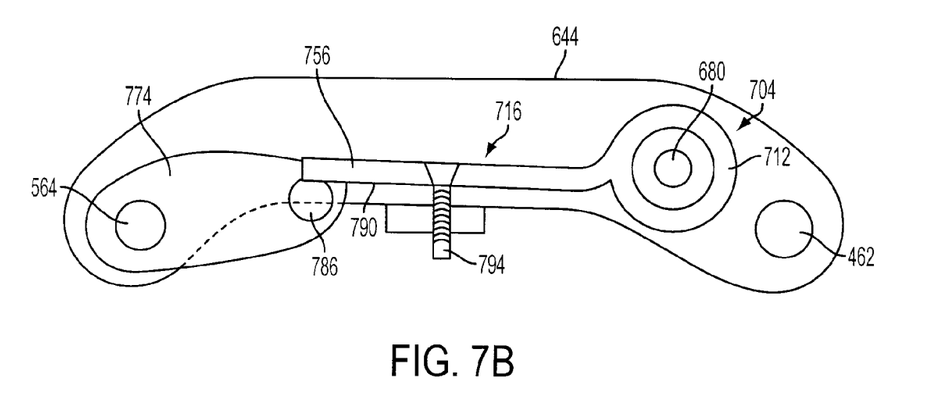
FIG. 7B is a schematic view of a second portion of the linkage mechanism and a second portion of the power storing mechanism in a neutral state.

FIG. 7A is a schematic view of first link plate 640, first actuating arm 760, and leg 740 of coil spring 704 when rear derailleur 66 is in a neutral state, and FIG. 7B is a schematic view of second link plate 644, second actuating arm 774, and spring coupling member 716 when rear derailleur 66 is in the neutral state. As shown in FIG. 7A, side surface 772 of leg 740 of coil spring 704 presses against first spring abutment 770 of first actuating arm 760 to bias first actuating arm 760 counterclockwise. As shown in FIG. 7B, side surface 790 of second leg 756 of spring coupling member 716 presses against second spring abutment 786 of second actuating arm 774 to bias second actuating arm 774 clockwise. As a result of the biasing forces acting on first actuating arm 760 and second actuating arm 774, first coupling surface 562 (FIG. 6) on first pivot shaft 554 contacts second coupling surface 572 on second pivot shaft 564.

Assume movable member 456 does not experience an excessive amount of resistance to lateral movement when the rider attempts to upshift rear derailleur 66. Then, when gear 504 rotates second pivot shaft 564 clockwise, second actuating arm 774 rotates clockwise. At the same time, second coupling surface 572 on second coupling flange 566 contacts first coupling surface 562 of first coupling flange 556, first pivot shaft 554 rotates clockwise together with second pivot shaft 564, and first actuating arm 760 rotates clockwise so that first spring abutment 770 communicates rotational force to leg 740 of coil spring 704, thereby tending to coil coiled portion 700 of coil spring 704 radially inwardly and producing a net clockwise bias. The clockwise bias is transmitted to link member 444 through spring shaft 680, link members 440 and 444 rotate clockwise around pivot shaft 448 and pivot shaft unit 452, respectively, and movable member 456 moves laterally outwardly.

When the rider attempts to downshift rear derailleur 66, gear 504 rotates second pivot shaft 564 counterclockwise, and second actuating arm 774 rotates counterclockwise so that second spring abutment 786 communicates rotational force to spring coupling member 716. Second coupling surface 572 on second coupling flange 566 decreases resistance to counterclockwise rotation of first pivot shaft 554 and first actuating arm 760. As a result, spring coupling member 716 rotates clockwise around spring shaft 680, coiled portion 700 of coil spring 704 again tends to coil radially inwardly, and coil spring 704 produces a net counterclockwise bias. This counterclockwise bias is transmitted to link member 444 through spring shaft 680, link members 440 and 444 rotate counterclockwise around pivot shaft 448 and pivot shaft unit 452, respectively, and movable member 456 moves laterally inwardly.

Figure 8A:
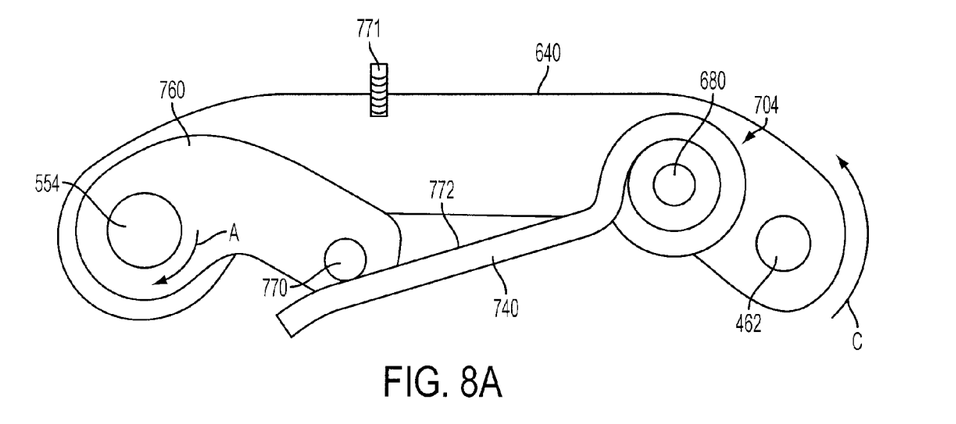
FIG. 8A is a schematic view of the first portion of the linkage mechanism and the first portion of the power storing mechanism in a first power storing state.
Figure 8B:
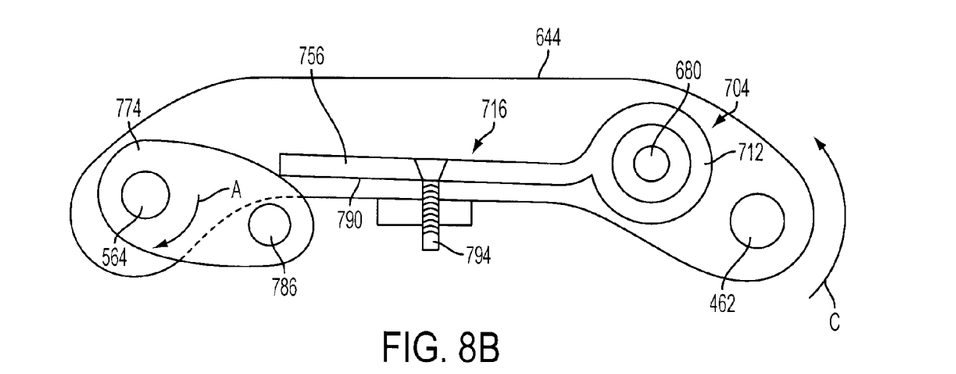
FIG. 8B is a schematic view of the second portion of the linkage mechanism and the second portion of the power storing mechanism in the first power storing state.

FIG. 8A is a schematic view of first link plate 640, first actuating arm 760, and leg 740 of coil spring 704 when rear derailleur 66 is in a first power storing state, and FIG. 8B is a schematic view of second link plate 644, second actuating arm 774, and spring coupling member 716 when rear derailleur 66 is in the first power storing state. The first power storing state generally occurs in two situations. The first situation occurs when derailleur control unit 310 attempts to move movable member 456, and hence chain guide 466, laterally outwardly (downwardly in FIGS. 8A and 8B) by causing pivot shaft unit 452 to rotate clockwise (in the direction of arrow A in FIGS. 8A and 8B), but movable member 456 experiences an excessive amount of resistance to such movement. The second situation occurs when a laterally inwardly directed external force is applied to movable member 456 (in the direction of arrow C in FIGS. 8A and 8B) while second pivot shaft 564 remains stationary.

When derailleur control unit 310 activates motor 480 to rotate pivot shaft unit 452 clockwise to upshift rear derailleur 66 in the first situation, gear 504 rotates second pivot shaft 564 clockwise, and second actuating arm 774 rotates clockwise. Adjustment screw 794 prevents spring coupling member 716 from moving, so second actuating arm 774 simply moves away from spring coupling member 716 as shown in FIG. 8B. Meanwhile, second coupling surface 572 on second coupling flange 566 contacts first coupling surface 562 of first coupling flange 556, first pivot shaft 554 rotates clockwise together with second pivot shaft 564, and first actuating arm 760 rotates clockwise so that first spring abutment 770 communicates rotational force to leg 740 of coil spring 704, thereby tending to coil coiled portion 700 of coil spring 704 radially inwardly and producing a net clockwise bias. Since movable member 456 is incapable of moving at this time, the net clockwise bias is stored by coil spring 704. When the resistance is removed from movable member 456, link members 440 and 444 rotate clockwise around pivot shaft 448 and pivot shaft unit 452, respectively, as a result of the stored clockwise bias until first link plate 640 and second link plate 644 return to the positions shown in FIGS. 7A and 7B.

A similar phenomenon occurs in the second situation when an external force is applied to movable member 456 in a direction toward the rear wheel (in the direction of arrow C in FIGS. 8A and 8B). In this case, first pivot shaft 554 and second pivot shaft 564 remain stationary while movable member 456 moves toward the rear wheel so that first link plate 640 and second link plate 644 pivot counterclockwise around first pivot shaft 554 and second pivot shaft 564, respectively. Since adjustment screw 794 forces spring coupling member 716 to move together with second link plate 644, second leg 756 of spring coupling member 716 may separate from second spring abutment 786 on second actuating arm 774. Since first actuating arm 760 is maintained stationary as a result of the contact between first coupling surface 562 on first coupling flange 556 and second coupling surface 572 on second coupling flange 566, first spring abutment 770 on first actuating arm 760 causes leg 740 of coil spring 704 to rotate counterclockwise around spring shaft 680, and a net clockwise bias results as described above. When the resistance is removed from movable member 456, link members 440 and 444 rotate clockwise around pivot shaft 448 and pivot shaft unit 452, respectively, as a result of the stored clockwise bias until first link plate 640 and second link plate 644 return to the positions shown in FIGS. 7A and 7B.

Figure 9A:
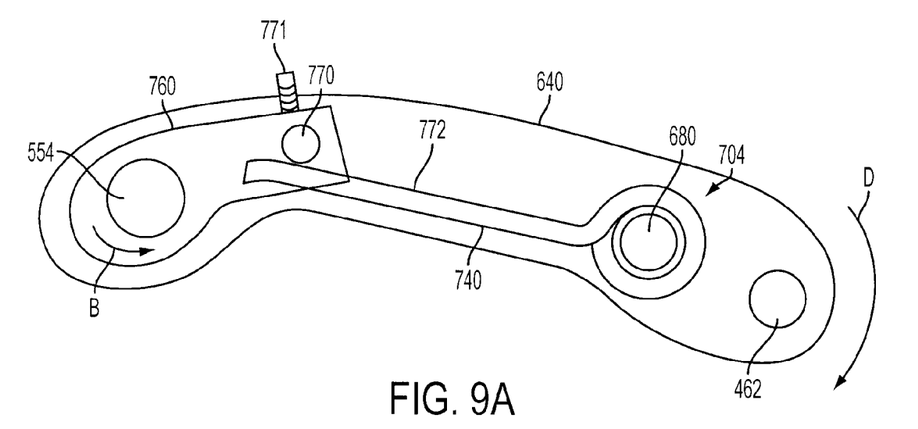
FIG. 9A is a schematic view of the first portion of the linkage mechanism and the first portion of the power storing mechanism in a second power storing state.
Figure 9B:
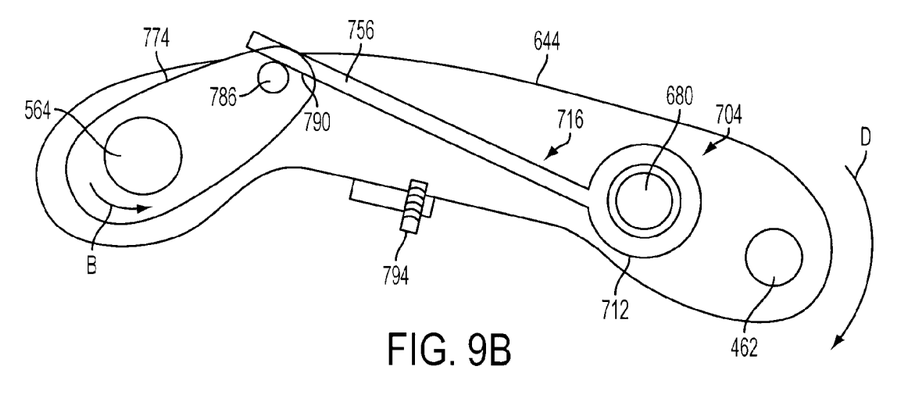
FIG. 9B is a schematic view of the second portion of the linkage mechanism and the second portion of the power storing mechanism in the second power storing state.

FIG. 9A is a schematic view of first link plate 640, first actuating arm 760, and leg 740 of coil spring 704 when rear derailleur 66 is in a second power storing state, and FIG. 9B is a schematic view of second link plate 644, second actuating arm 774, and spring coupling member 716 when rear derailleur 66 is in the second power storing state. Like the first power storing state, the second power storing state generally occurs in two situations. The first situation occurs when derailleur control unit 310 attempts to move movable member 456, and hence chain guide 466, laterally inwardly (upwardly in FIGS. 9A and 9B) by causing pivot shaft unit 452 to rotate counterclockwise (in the direction of arrow B in FIGS. 9A and 9B), but movable member 456 experiences an excessive amount of resistance to such movement. The second situation occurs when a laterally outwardly directed external force is applied to movable member 456 (in the direction of arrow D in FIGS. 9A and 9B) while second pivot shaft 564 remains stationary.

When derailleur control unit 310 activates motor 480 to rotate pivot shaft unit 452 counterclockwise to downshift rear derailleur 66 in the first situation, gear 504 rotates second pivot shaft 564 counterclockwise, second actuating arm 774 rotates counterclockwise, and second spring abutment 786 rotates second leg 756 of spring coupling member 716 clockwise around spring shaft 680 as shown in FIG. 9B. Spring coupling member 716 separates from adjustment screw 794 at this time. Second coupling flange 566 rotates together with second pivot shaft 564, but adjustment screw 771 forces first actuating arm 760 to remain stationary, so second coupling projection 570 simply separates from first coupling projection 560. In other words, second actuating arm 774 moves relative to first actuating arm 760. A net counterclockwise bias results from the clockwise rotation of spring coupling member 716 around spring shaft 680. When the resistance is removed from movable member 456, link members 440 and 444 rotate counterclockwise around pivot shaft 448 and pivot shaft unit 452, respectively, as a result of the stored counterclockwise bias until first link plate 640 and second link plate 644 return to the positions shown in FIGS. 7A and 7B.

A similar phenomenon occurs in the second situation when an external force is applied to movable member 456 in a direction away from the rear wheel (in the direction of arrow D in FIGS. 9A and 9B). In this case, second pivot shaft 564 remains stationary while movable member 456 moves away from the rear wheel so that first link plate 640 and second link plate 644 pivot clockwise around first pivot shaft 554 and second pivot shaft 564, respectively. As a result, second spring abutment 786 on second actuating arm 774 causes spring coupling member 716 to rotate clockwise around spring shaft 680 as shown in FIG. 9B, and spring coupling member 716 separates from adjustment screw 794. Meanwhile, adjustment screw 771 forces first actuating arm 760 to rotate clockwise together with first link plate 640, so first coupling projection 560 on first coupling flange 556 simply separates from second coupling projection 570 on second coupling flange 566. In other words, first actuating arm 760 moves relative to second actuating arm 774. A net counterclockwise bias results from the clockwise rotation of spring coupling member 716 around spring shaft 680. When the external force is removed from movable member 456, link members 440 and 444 rotate counterclockwise around pivot shaft 448 and pivot shaft unit 452, respectively, as a result of the stored counterclockwise bias until first link plate 640 and second link plate 644 return to the positions shown in FIGS. 7A and 7B.

While the above is a description of various embodiments of inventive features, further modifications may be employed without departing from the spirit and scope of the present invention. For example, the gear mechanism within rear derailleur housing may be omitted, and motor 480 may operate actuating arm 716 through a cable. The teachings herein may be applied to a front derailleur. Coil spring 704 may be replaced by a leaf spring, or any other type of biasing element.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A derailleur for a bicycle comprising:
a base member for attaching the derailleur to the bicycle;
a movable member for supporting a chain guide;
a linkage mechanism coupling the base member to the movable member so that the movable member is capable of movement relative to the base member;
an electrically operated actuating element operatively coupled to the linkage mechanism, wherein moving the actuating element in a first direction causes the movable member to move laterally toward the bicycle, and wherein moving the actuating element in a second direction causes the movable member to move laterally away from the bicycle; and
a power storing mechanism;
wherein a first portion of the power storing mechanism is disposed in a first power transmission path between the actuating element and the movable member for storing relative forces applied between the actuating element and the movable member along the first power transmission path;
wherein a second portion of the power storing mechanism is disposed in a different second power transmission path between the actuating element and the movable member for storing relative forces applied between the actuating element and the movable member along the second power transmission path; and
wherein the actuating element comprises:
a first actuating member that communicates force only in the first power transmission path; and
a second actuating member that communicates force only in the second power transmission path;
wherein the first actuating member moves relative to the second actuating member.

2. The derailleur according to claim 1 wherein the power storing mechanism is disposed away from the base member.

3. The derailleur according to claim 1 wherein the power storing mechanism comprises only one spring.

4. The derailleur according to claim 1 wherein the power storing mechanism comprises a coil spring that coils radially inwardly when the power storing mechanism stores forces.

5. The derailleur according to claim 1 wherein the linkage mechanism comprises:
a first link member having a first portion and a second portion, wherein the first portion of the first link member is pivotably coupled to the base member, and wherein the second portion of the first link member is pivotably coupled to the movable member; and
a second link member having a first portion and a second portion, wherein the first portion of the second link member is pivotably coupled to the base member, and wherein the second portion of the link member is pivotably coupled to the movable member.

6. The derailleur according to claim 5 wherein the power storing mechanism comprises:
a first biasing element disposed in the first power transmission path between the actuating element and the movable member for storing relative forces applied between the actuating element and the movable member; and
a second biasing element disposed in the second power transmission path between the actuating element and the movable member for storing relative forces applied between the actuating element and the movable member.

7. The derailleur according to claim 6 wherein moving the actuating element in a first direction toward one of the first link member or the second link member and away from the other one of the first link member or the second link member causes the movable member to move laterally toward the bicycle, wherein moving the actuating element in a second direction toward the other one of the first link member or the second link member and away from the one of the first link member or the second link member causes the movable member to move laterally away from the bicycle, wherein the actuating element moves the first biasing element toward the one of the first link member or the second link member when the actuating element moves in the first direction, and wherein the actuating element moves the second biasing element toward the other one of the first link member or the second link member when the actuating element moves in the second direction.

8. The derailleur according to claim 6 wherein the first biasing element and the second biasing element are disposed between the first actuating member and the second actuating member.

9. The derailleur according to claim 1 wherein the linkage mechanism comprises a link member having a first portion and a second portion, wherein the first portion is coupled to the base member to pivot relative to the base member, and wherein the second portion is coupled to the movable member to pivot relative to the movable member.

10. The derailleur according to claim 9 wherein the link member is coupled to the base member through a pivot shaft unit.

11. The derailleur according to claim 10 wherein the link member rotates relative to the pivot shaft unit.

12. The derailleur according to claim 10 wherein the pivot shaft unit moves the actuating element.

13. The derailleur according to claim 12 wherein the pivot shaft unit comprises:
a first pivot shaft; and
a second pivot shaft;
wherein the first pivot shaft rotates relative to the second pivot shaft.

14. The derailleur according to claim 13 wherein the first pivot shaft moves the first actuating member, and wherein the second pivot shaft moves the second actuating member.

15. The derailleur according to claim 13 wherein the first pivot shaft rotates the first actuating member, and wherein the second pivot shaft rotates the second actuating member.

16. The derailleur according to claim 15 wherein the first actuating member rotates coaxially relative to second actuating member.

17. The derailleur according to claim 16 wherein the first actuating member includes a first coupling surface, wherein the second actuating member includes a second coupling surface, and wherein the first actuating member and the second actuating member rotate together as a unit when the first pivot shaft and the second pivot shaft rotate in a first direction and the first coupling surface engages the second coupling surface.

18. The derailleur according to claim 17 wherein the first actuating member rotates relative to the second actuating member when the first pivot shaft rotates in a second direction relative to the second pivot shaft.

19. The derailleur according to claim 18 wherein at least one of the first pivot shaft or the second pivot shaft includes a driven gear nonrotatably mounted thereto.

20. The derailleur according to claim 19 further comprising an electric motor mounted to the derailleur for rotating the driven gear.

21. The derailleur according to claim 1 wherein the first actuating member communicates force in parallel with the second actuating member.

* * * * *